(12) United States Patent
Lu et al.

(10) Patent No.: US 9,906,441 B2
(45) Date of Patent: Feb. 27, 2018

(54) RAPID FLOOD PROCESSING

(71) Applicant: HANGZHOU H3C TECHNOLOGIES CO., LTD., Zhejiang (CN)

(72) Inventors: Lu Lu, Beijing (CN); Wei Wang, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 42 days.

(21) Appl. No.: 15/112,014

(22) PCT Filed: Jan. 16, 2015

(86) PCT No.: PCT/CN2015/070825
§ 371 (c)(1),
(2) Date: Jul. 15, 2016

(87) PCT Pub. No.: WO2015/106706
PCT Pub. Date: Jul. 23, 2015

(65) Prior Publication Data
US 2016/0337233 A1   Nov. 17, 2016

(30) Foreign Application Priority Data
Jan. 17, 2014  (CN) .......................... 2014 1 0021145

(51) Int. Cl.
*H04L 12/753* (2013.01)
*H04L 12/64* (2006.01)
(Continued)

(52) U.S. Cl.
CPC .......... *H04L 45/48* (2013.01); *H04L 12/6418* (2013.01); *H04L 45/122* (2013.01); *H04L 45/66* (2013.01)

(58) Field of Classification Search
CPC ... H04L 12/6418; H04L 45/122; H04L 45/48; H04L 45/66
See application file for complete search history.

(56) References Cited

U.S. PATENT DOCUMENTS 6,862,624 B2 * 3/2005 Colby ..................... H04L 29/06
709/220
6,976,088 B1 * 12/2005 Gai ..................... H04L 12/4641
370/256

(Continued)

FOREIGN PATENT DOCUMENTS

| CN | 102882784 A | 1/2013 |
| CN | 103155485 A | 6/2013 |
| CN | 103269299 A | 8/2013 |

OTHER PUBLICATIONS

International Search Report and Written Opinion, International Application No. PCT/CN2015/070825, dated May 4, 2015, pp. 1-7, The State Intellectual Property Office of the P.R. China.

*Primary Examiner* — Khaled Kassim
(74) *Attorney, Agent, or Firm* — Hewlett Packard Enterprise Patent Department

(57) ABSTRACT

When a device is a primary backbone device, the device adds a backbone device on each branch of a STP tree calculated by the device to a selected group, wherein a distance between the device and the added backbone device is kN hops, where k is an integer and N is a predefined natural number, 3≤N≤6, k=1, 2, . . . . The device enables a rapid flood function, and notifies backbone devices in the selected group of the enabling of the rapid flood function.

15 Claims, 10 Drawing Sheets

(51) Int. Cl.
    *H04L 12/733*     (2013.01)
    *H04L 12/721*     (2013.01)

(56) References Cited

U.S. PATENT DOCUMENTS

| | | | |
|---|---|---|---|
| 7,894,342 | B2 | 2/2011 | Finn et al. |
| 2001/0033574 | A1* | 10/2001 | Enoki ............... H04L 45/00 370/396 |
| 2003/0031123 | A1* | 2/2003 | Gilmour ........... G06F 15/8023 370/216 |
| 2005/0094594 | A1* | 5/2005 | Roh .................. H04L 45/00 370/328 |
| 2007/0071016 | A1 | 3/2007 | Sadot |
| 2008/0071894 | A1* | 3/2008 | Luss ................ H04N 7/17336 709/223 |
| 2009/0296668 | A1* | 12/2009 | Capone ............ H04W 72/1257 370/337 |
| 2010/0039984 | A1* | 2/2010 | Brownrigg ........ H04B 7/18584 370/316 |
| 2010/0040070 | A1* | 2/2010 | Suh .................. H04L 45/00 370/400 |
| 2011/0267982 | A1* | 11/2011 | Zhang .............. H04B 7/2606 370/256 |
| 2013/0208624 | A1 | 8/2013 | Ashwood-Smith |
| 2015/0271056 | A1* | 9/2015 | Chunduri .......... H04L 45/02 370/238 |
| 2017/0034285 | A1* | 2/2017 | Bhandari .......... H04L 67/16 |

\* cited by examiner

RAPID FLOOD PROCESSING

BACKGROUND

Shortest Path Bridging (SPB) is an Ethernet standard specified by IEEE802.1aq, and is an extension of Multiple Spanning Tree Protocol (MSTP). The SPB may be used in the creation of a large flat non-blocking layer 2 network. The SPB shares link states in the network through an Intermediate System to Intermediate System (SPB-IS-IS), and each node in the network calculates the shortest paths between the node and other nodes respectively. Accordingly, instability caused by the usage of Spanning Tree Protocol (STP) and low utilization efficiency of some links may be avoided.

IEEE802.1aq specifies two SPB modes including a Shortest Path Bridging VLAN (SPBV) mode and a Shortest Path Bridging MAC (SPBM) mode (also called a Mac-in-Mac (M-in-M) mode). The SPBM mode adopts a packet encapsulation format and an idea of multi-instance, which have been specified by IEEE 802.1ah, but redefines a forwarding mode of data plane and a control plane. The SPB-IS-IS learns link state information, synchronizes the link state information in the whole network and calculates forwarding paths.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
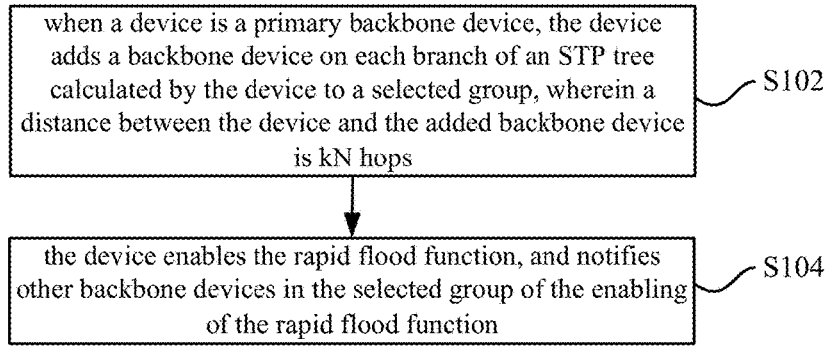
FIG. 1 is a flowchart illustrating a rapid flood processing method for an SPBM network according to an example of the present disclosure.
Figure 2:
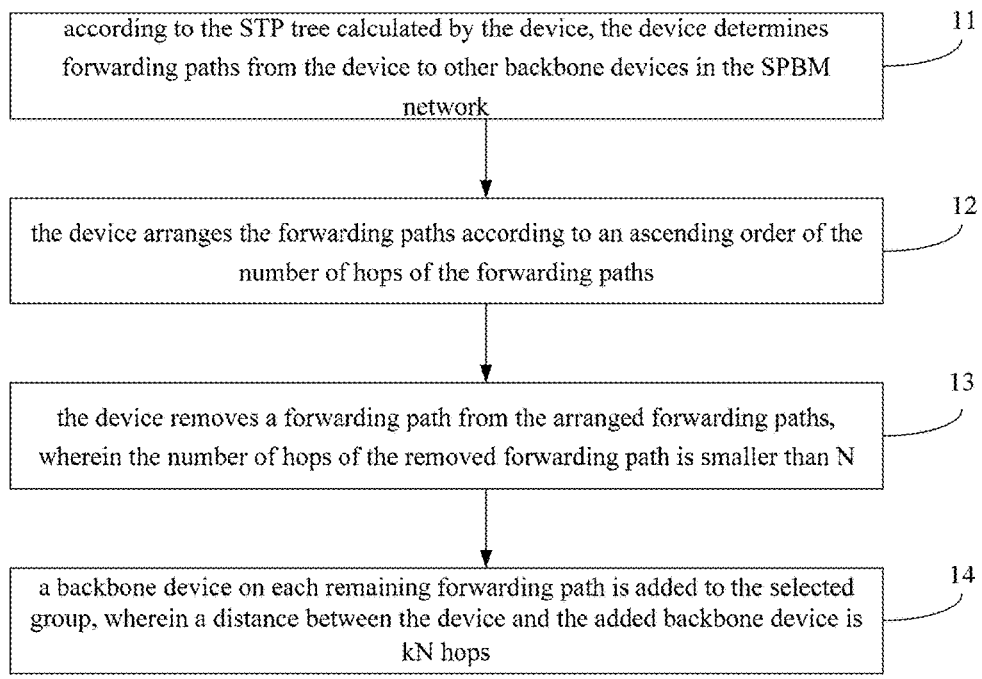
FIG. 2 is a flowchart illustrating a method for adding a backbone device to a selected group according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

In an SPBM network, a backbone network includes Backbone Edge Bridges (BEBs), Backbone Core Bridges (BCBs) and backbone links between these devices.

Some terms related to the SPBM network are illustrated as follows.

A BEB is an edge device of the backbone network, and is equivalent to a Provider Edge (PE) device in a Multiprotocol Label Switching (MPLS) network. The BEB may encapsulate a packet received from a user network into an M-in-M packet, and forward the M-in-M packet to the backbone network. Further, the BEB may decapsulate an M-in-M packet received from the backbone network into a packet, and forward the packet to the user network.

The BCB is a core device of the backbone network, and is equivalent to a Provider (P) device in the MPLS network. The BCB may forward an M-in-M packet according to Backbone MAC (B-MAC) and Backbone Virtual Local Area Network (B-VLAN). The BCB may forward packets and learn MAC addresses in the backbone network, but it is not necessary for the BCB to learn a large number of MAC addresses in the user network. If fewer MAC addresses are learned this may decrease network deployment costs and provide good expansibility for the backbone network.

When encapsulating a user packet into an M-in-M packet, the BEB adds a MAC address and a VLAN) to the user packet. The MAC address and the VLAN are assigned by an operator, and called B-MAC and B-VLAN respectively. In the backbone network, the BCB forwards the M-in-M packet according to the B-MAC and the B-VLAN. The B-MAC includes source B-MAC and destination B-MAC. When encapsulating the user packet into the M-in-M packet, the BEB takes the MAC address of the BEB as the source B-MAC, and takes the MAC address of a BEB at the destination of an SPBM tunnel as the destination B-MAC.

In the backbone network, one service instance represents one type of services or users. A Backbone Service Instance Identifier (I-SID) is a unique number of a service instance.

A packet generated after performing M-in-M encapsulation is called an M-in-M packet. During the M-in-M encapsulation, an I-SID, a B-VLAN tag and B-MAC information of a service instance are added to the outer layer of an original Ethernet packet, and the backbone network forwards the M-in-M packet according to the I-SID, the B-VLAN tag and the B-MAC information.

In a SPB-ISIS, each node (for example, a BEB or a BCB) in the backbone network generates Link State PDU (LSP)

information. The LSP information contains a relationship among all link state information, B-MAC/B-VLAN and an I-SID of the node. And then, the LSP information is carried in an IS-IS LSP packet by the node and the IS-IS LSP packet is sent to adjacent nodes through all ports of the node. After receiving the IS-IS LSP packet, each of the adjacent nodes reports the IS-IS LSP packet to a CPU. The CPU processes the IS-IS LSP packet and updates a local Link State Data Base (LSDB). Afterwards, the adjacent node sends the IS-IS LSP packet to its adjacent nodes through its all ports. This procedure may be repeated until LSDBs of all nodes in the backbone network become identical. In this case, network topology converges. When each of all nodes in the backbone network receives LSP information of other nodes, the nodes calculate STP trees, generate forwarding entries and configure the forwarding entries on a data plane. The data plane encapsulates and forwards packets according to the forwarding entries. According to an interaction principle of IS-IS protocol, when the network topology changes (for example, link disconnection or link recovery), a node detecting the change of the network topology is to create new LSP information, and floods the new LSP information in the whole network through the above described procedure, thereby recalculating STP trees and issuing forwarding entries.

During the above flood procedure of the IS-IS LSP packet, each node reports the IS-IS LSP packet to its CPU after receiving the IS-IS LSP packet, then the CPU issues the IS-IS LSP packet to the data plane after processing and saving the IS-IS LSP packet, and finally the data plane forwards the IS-IS LSP packet to adjacent nodes of the node.

An example of the present disclosure provides a rapid flood solution. A node enabling a rapid flood function may be selected from a backbone network and a service instance with I-SID=255 may be defined as a default forwarding instance in a SPB-ISIS protocol. The default service instance may support the rapid flood function, and allow a specific protocol packet such as an IS-IS LSP packet to be sent to other nodes enabling the rapid flood function in the backbone network through a data forwarding channel after the specific protocol packet is encapsulated into an M-in-M packet. After receiving the M-in-M packet, the nodes enabling the rapid flood function may parse the M-in-M packet to obtain contents of the specific protocol packet.

The rapid flood procedure may be implemented as follows. Each node enabling the rapid flood function in the backbone network saves forwarding information from the node to other nodes enabling the rapid flood function in the default service instance. After a node enabling the rapid flood function in the backbone network generates LSP information or receives an ISIS LSP packet, the node enabling the rapid flood function encapsulates the LSP information into an M-in-M packet according to the forwarding information from the node to other nodes enabling the rapid flood function and sends the M-in-M packet to other nodes. After receiving the M-in-M packet, each of other nodes enabling the rapid flood function reports the M-in-M packet to its CPU. The CPU parses the M-in-M packet to obtain the ISIS LSP packet and updates a local LSDB, and then sends the ISIS LSP packet through all ports of the node.

During the rapid flood procedure, if a node unenabling the rapid flood function receives an M-in-M packet containing a specific protocol packet, the node unenabling the rapid flood function does not report the M-in-M packet to its CPU but forwards the M-in-M packet. Accordingly, the specific protocol packet such as the IS-IS LSP packet may be sent to remote nodes enabling the rapid flood function in leaps through the rapid flood procedure, rather than flooded in the whole network step by step. Based on the combination of ordinary flood method and rapid flood method, the time spent by the flood procedure is reduced, and flood speed is increased greatly.

In following examples of the present disclosure, the SPBM network may include at least two backbone devices. Herein, a BEB and a BCB are called the backbone devices generally. Each backbone device may support the rapid flood function.

That is, each backbone device follows IEEE802.1aq, and supports a default service instance. The default service instance may be used for implementing the rapid flood function. Further, each backbone device has a capability of parsing a specific protocol packet reported by the default service instance.

For example, the specific protocol packet may be an ISIS LSP packet.

FIG. 1 is a flowchart illustrating a rapid flood processing method for an SPBM network according to an example of the present disclosure. The rapid flood processing method provided by the example of the present disclosure is performed by a backbone device. As shown in FIG. 1, the method includes following blocks.

At block S102, when a device is a primary backbone device, the device adds a backbone device on each branch of an STP tree calculated by the device to a selected group, wherein a distance between the device and the added backbone device is kN hops, k is an integer and N is a predefined natural number between 3 and 6 inclusive; i.e. $3 \leq N \leq 6$, $k=1, 2, \ldots$.

According to the SPB-ISIS protocol, each backbone device in the SPBM network calculates an STP tree by taking the backbone device itself as a root. In an example, the primary backbone device may be selected by a user. The user may select a backbone device as the primary backbone device manually, thereby increasing the control of the user on the SPBM network.

If the primary backbone device is selected by the user manually, each backbone device may determine whether it is the primary backbone device through a configuration. For example, each backbone device may determine whether it is the primary backbone device according to configuration information.

In another example, the primary backbone device may be selected through an automatic vote method. All backbone devices in the SPBM network vote to determine the primary backbone device. Each backbone device determines through the automatic vote method whether it is the primary backbone device. For example, each backbone device determines whether its ID meets a predefined rule. When determining that its ID meets the predefined rule, the backbone device determines that it is the primary backbone device. Otherwise, the backbone device determines that it is not the primary backbone device. The predefined rule includes that the ID of the backbone device is the largest or smallest ID among IDs of all backbone devices in the SPBM network.

In the automatic vote method, after STP trees are calculated, each backbone device saves information related to all backbone devices in the SPBM network. Each backbone device determines whether its ID is the largest or smallest ID among IDs of all backbone devices in the SPBM network. When determining that its ID is the largest or smallest ID, the backbone device determines that it is the primary backbone device.

In an example, the ID of a backbone deice may be a System_ID (that is, a system ID) or a SpsourceID (that is, an ID generated by system).

In order to reasonably deploy backbone devices enabling the rapid flood function in the SPBM network, N may be equal to 3, 4, 5 or 6, for example, N=3. When N=3, there are two backbone devices unenabling the rapid flood function between any two backbone devices enabling the rapid flood function. That is, for each backbone device in the SPBM network, either the backbone device has enabled the rapid flood function, or at least one adjacent device of the backbone device has enabled the rapid flood function. In this case, when network topology changes, at least one backbone device enabling the rapid flood function may rapidly apperceive the change of the network topology, and may send a specific protocol packet to all devices in the SPBM network rapidly based on the combination of rapid flood method and the ordinary flood method.

Block S102 includes following blocks 11-14.

At block 11, according to the STP tree calculated by the device, the device determines forwarding paths from the device to other backbone devices in the SPBM network.

At block 12, the device arranges the forwarding paths according to an ascending order of the number of hops of the forwarding paths.

At block 13, the device removes a forwarding path from the arranged forwarding paths, wherein the number of hops of the removed forwarding path is smaller than N.

Since the number of forwarding paths determined at block 11 is large, the amount of calculation may be reduced if the forwarding path is removed, wherein the number of hops of the removed forwarding path is smaller than N.

At block 14, a backbone device on each remaining forwarding path is added to the selected group, wherein a distance between the device and the added backbone device is kN hops.

Through blocks 11-14, some backbone devices may be added to the selected group, wherein the distance between the device and each of the added backbone devices is kN hops. Accordingly, all backbone devices enabling the rapid flood function in the SPBM network may be selected automatically.

Furthermore, in an example, when the number of hops M between the last backbone device on each remaining forwarding path and a specific backbone device meets a condition, the last backbone device is added to the selected group. The specific backbone device is a backbone device that is closest to the last backbone device on the forwarding path and has been added to the selected group. The condition is N/2<M<N. Accordingly, not only the backbone devices may be added to the selected group, wherein the distance between each of the added backbone devices and the primary backbone device is kN hops, but also the last backbone device meeting the condition on the forwarding path may also be added to the selected group, thereby improving the convergence speed of the network topology.

For example, in block 14, a counter with a counting circle N may be set. On each remaining forwarding path, a counter is started, which starts to count from the device selected as the primary backbone device. The value of the counter is added by 1 every time when one backbone device is counted. When the value of the counter is added by 1 over again after the value of the counter becomes N−1, the value of the counter is reset as 0 and the counter is recounted. The above procedure is repeated until the last backbone device on the forwarding path is counted. In this procedure, a backbone device at which the value of the counter is reset as 0 is added to the selected group. When the last backbone device (that is, the last-hop backbone device) is counted, if the value M of the counter meets the condition N/2<M<N, the last backbone device is added to the selected group.

For example, when N=3, a forwarding path is device 1—device 2—device 3—device 4—device 5—device 6, and a counting result of the counter is: device 1 (0)—device 2 (1)—device 3 (2)—device 4 (0)—device 5 (1)—device 6 (2).

The values in ( ) represent the values of the counter.

Accordingly, device 4 and device 6 on the forwarding path are added to the selected group.

At block S 104, the device enables the rapid flood function, and notifies other backbone devices in the selected group of the enabling of the rapid flood function.

The enabling the rapid flood function includes configuring a default service instance for implementing the rapid flood function, and the disabling the rapid flood function includes deleting the default service instance.

At block S 104, in order to notify other backbone devices in the selected group of the enabling of the rapid flood function, the primary backbone device may send a first notification message to all other backbone devices in the SPBM network. The first notification message includes IDs of backbone devices in the selected group. The primary backbone device may encapsulate the first notification message into an ISIS LSP packet, and send the ISIS LSP packet to all other backbone devices in the SPBM network. Since all backbone devices in the SPBM network have not enabled the rapid flood function, each of other backbone devices receiving the first notification message in the SPBM network determines whether the first notification message contains the ID of the backbone device. When determining that the first notification message does not contain the ID of the backbone device, the backbone device does not enable the rapid flood function. Otherwise, the backbone device enables the rapid flood function.

After the primary backbone device and all other backbone devices in the selected group enable the rapid flood function, these backbone devices enabling the rapid flood function may rapidly flood the specific protocol packet such as the ISIS LSP packet. When network topology changes, the ISIS LSP packet may be rapidly flooded in the SPBM network based on the combination of ordinary flood method and rapid flood method, thereby reducing the time spent by the flood procedure and increasing the flood speed.

In the solution provided by the examples of the present disclosure, a backbone device is selected from the SPBM network as the primary backbone device. The primary backbone device adds a backbone device on each branch of the STP tree calculated by the primary backbone device to the selected group, wherein the distance between the primary backbone device and the added backbone device is kN hops, 3≤N≤6, k=1, 2, . . . . After adding all backbone devices meeting the condition to the selected group, the primary backbone device enables the rapid flood function, and notifies all backbone devices in the selected group of the enabling of the rapid flood function. Accordingly, through automatically selecting and enabling the rapid flood function of the backbone devices in the SPBM network, the rapid flooding may be implemented. By the rapid flood processing method provided by the examples of the present disclosure, the devices enabling the rapid flood function may be automatically selected and deployed, and the rapid flood function of these devices may be automatically enabled. Further, there are 2-5 backbone devices unenabling the rapid flood function between any two backbone devices enabling rapid flood function. Accordingly, the number of backbone devices enabling the rapid flood function in the SPBM network is proper. If the backbone devices enabling the rapid flood function are deployed reasonably in the SPBM network, the network topology may be well converged, and the number of redundant specific protocol packets may be reduced.

For illustrative purposes, a backbone device enabling the rapid flood function is called a rapid flood device, and a backbone device unenabling the rapid flood function is called an ordinary flood device.

The change of network topology may result in various cases.

In a case, the primary backbone device is unchanged, and the selected group changes.

When the network topology changes, STP trees are recalculated, and thus a new selected group should be calculated according to the new STP trees. In this case, the change of the network topology includes device failure, link disconnection, and the increase or decrease of the number of devices. However, the change of the network topology does not include following cases, for example, the rapid flood function of the primary backbone device is disabled manually and the primary backbone device is abnormal, because the primary backbone device cannot be used as the primary backbone device any more in these cases.

If an ISIS LSP packet is flooded and a specific protocol packet is the ISIS LSP packet, the flood procedure of the ISIS LSP packet includes following various procedures when the network topology changes.

When a rapid flood device in the SPBM network detects the change of the network topology (that is, the link state of the device changes), the rapid flood device not only encapsulates a new ISIS LSP packet into an M-in-M packet according to a rapid flood method and sends the M-in-M packet to other rapid flood devices, but also sends the new ISIS LSP packet through all ports according to an ordinary flood method. After receiving the new ISIS LSP packet, each ordinary flood device in the SPBM network updates a local LSDB, and continues to send the new ISIS LSP packet through its all ports. After receiving the M-in-M packet containing the new ISIS LSP packet, each of other rapid flood devices updates a local LSDB, and sends the new ISIS LSP packet through its all ports according to the ordinary flood method.

Accordingly, if the rapid flood device detecting the change of the network topology is the primary backbone device, it is the primary backbone device that detects the change of the network topology firstly. If the rapid flood device detecting the change of the network topology is not the primary backbone device, since the rapid flood device detecting the change of the network topology sends the M-in-M packet containing the new ISIS LSP packet to the primary backbone device, the primary backbone device will learn the change of the network topology.

When an ordinary flood device in the SPBM network detects the change of the network topology (that is, the link state of the device changes), the ordinary flood device sends a new ISIS LSP packet through its all ports according to the ordinary flood method. After receiving the new ISIS LSP packet, each of ordinary flood devices in the SPBM network updates a local LSDB, and continues to send the new ISIS LSP packet through its all ports. A rapid flood device receiving the new ISIS LSP packet firstly in the SPBM network updates a local LSDB after receiving the new ISIS LSP packet. The rapid flood device receiving the new ISIS LSP packet firstly not only encapsulates the new ISIS LSP packet into an M-in-M packet according to the rapid flood method and sends the M-in-M packet to other rapid flood devices, but also sends the new ISIS LSP packet through its all ports according to the ordinary flood method. After receiving the M-in-M packet containing the new ISIS LSP packet, each of other rapid flood devices updates a local LSDB, and sends the new ISIS LSP packet through its all ports according to the ordinary flood method.

Accordingly, in the procedure, if the rapid flood device receiving the new ISIS LSP packet firstly is the primary backbone device, the primary backbone device will learn the change of the network topology after receiving the new ISIS LSP packet. If the rapid flood device receiving the new ISIS LSP packet firstly is not the primary backbone device, since a rapid flood device receiving the new ISIS LSP packet firstly sends the M-in-M packet containing the new ISIS LSP packet to the primary backbone device, the primary backbone device will learn the change of the network topology.

Accordingly, the primary backbone device may learn the change of the network topology through three methods, that is, the primary backbone device detects the change of the network topology, the primary backbone device receives a new specific protocol packet, and the primary backbone device receives an M-in-M packet containing a new specific protocol packet.

When the primary backbone device is selected through different methods (for example, the configuration method and the automatic vote method), the primary backbone device performs following processing after learning the change of the network topology. For example, the primary backbone device is selected through the configuration.

The primary backbone device clears the selected group, adds a backbone device on each branch of a new STP tree calculated by the primary backbone device to a new selected group, wherein the distance between the primary backbone device and the added backbone devices is kN hops. The primary backbone device notifies backbone devices in the new selected group of the enabling of the rapid flood function, and notifies backbone devices in the previous selected group but not in the new selected group of the disabling of the rapid flood function.

Since the primary backbone device is configured manually by the user, the primary backbone device is not reselected even if the network topology changes because a new backbone device is added to the SPBM network. The primary backbone device calculates a new STP tree according to the changed network topology and calculates a new selected group.

For example, the primary backbone device is selected through the automatic vote method.

If the network topology changes because a new backbone device is added to the SPBM network, the primary backbone device determines over again whether the ID of the primary backbone device meets the predefined rule. If the ID of the primary backbone device meets the predefined rule, the primary backbone device clears the selected group, and adds a backbone device on each branch of a new STP tree calculated by the primary backbone device to a new selected group, wherein the distance between the primary backbone device and the added backbone device is kN hops. The primary backbone device notifies backbone device in the previous selected group but not in the new selected group of the disabling of the rapid flood function.

When the primary backbone device is selected through the automatic vote method, the primary backbone device determines over again whether the ID of the primary backbone device meets the predefined rule. If the ID of the primary backbone device meets the predefined rule, the primary backbone device is still taken as the primary backbone device. The primary backbone device calculates a new STP tree according to the changed network topology, and calculates a new selected group. If the ID of the primary backbone device does not meet the predefined rule, the primary backbone device cannot be used as the primary backbone device any more.

In an example, a method for notifying the backbone devices in the new selected group of the enabling of the rapid flood function and notifying the backbone devices in the previous selected group but not in the new selected group of the disabling of the rapid flood function includes following processes.

The primary backbone device sends a first notification message to all other backbone devices in the SPBM network. The first notification message includes IDs of backbone devices in the new selected group. After receiving the first notification message, each of other backbone devices in the SPBM network determines whether the first notification message contains the ID of the backbone device. When determining that the first notification message does not contain the ID of the backbone device and the backbone device has enabled the rapid flood function, the backbone device disables its rapid flood function. When determining that the first notification message contains the ID of the backbone device, the backbone device enables its rapid flood function if the backbone device has not enabled the rapid flood function, and does not perform any processing if the backbone device has enabled the rapid flood function.

In order that the change of the selected group does not influence the rapid flooding of the specific protocol packet such as the ISIS LSP packet, the primary backbone device calculates the new selected group until the primary backbone device learns the change of the network topology, finishes the flooding of the ISIS LSP packet and calculates the new STP tree according to new LSP information. Further, the primary backbone device notifies the backbone devices in the new selected group of the enabling of the rapid flood function, and notifies the backbone devices in the previous selected group but not in the new selected group of the disabling of the rapid flood function. That is, the deployment of the rapid flood devices is changed until the primary backbone device learns the change of the network topology and a period of time is delayed. Accordingly, when the network topology changes, backbone devices performing rapid flooding are still the backbone devices in the previous selected group, and the primary backbone device sends the first notification message until the LSP information is updated after the new network topology converges.

In another case, the primary backbone device is changed.

When the rapid flood function of the primary backbone device is disabled manually, when the primary backbone device is abnormal, or when a new backbone device is added to the SPBM network and the ID of the primary backbone device does not meet the predefined rule, the primary backbone device will be changed.

Various conditions for the change of the primary backbone device will be illustrated hereinafter.

In a condition, a new backbone device is added to the SPBM network and the ID of the primary backbone device does not meet the predefined rule.

In the condition, the primary backbone device performs following processes. After learning the change of the network topology, the primary backbone device determines over again whether the ID of the primary backbone device meets the predefined rule. If the ID of the primary backbone device does not meet the predefined rule, the primary backbone device is switched to a non-primary backbone device, and the non-primary backbone device sends a second notification message to other backbone devices in the SPBM network. The second notification message is used for indicating other backbone devices in the SPBM network to reselect a primary backbone device through the automatic vote method.

In another condition, the rapid flood function of the primary backbone device is disabled manually.

In the condition, the primary backbone device performs following processes. After the rapid flood function of the primary backbone device is disabled, the primary backbone device sends the second notification message to other backbone devices in the SPBM network. The second notification message is used for indicating other backbone devices in the SPBM network to reselect a primary backbone device through the automatic vote method.

In the above conditions, the second notification message may be sent out along with an ISIS LSP packet. After receiving the second notification message, each of other backbone devices in the SPBM network reselects the primary backbone device through the automatic vote method.

In the latter condition, after the rapid flood function of the primary backbone device is disabled manually, the primary backbone device does not participate in the selection of a new primary backbone device.

In another condition, the primary backbone device is abnormal.

The abnormality of the primary backbone device may be illustrated as follows. When the network is stable and rapid flood devices have been deployed automatically, the primary backbone device becomes invalid and cannot send packets because the primary backbone device is powered off or an SPBM function is unenabled globally. Or, the primary backbone device is peeled off the STP tree because of overload set or configuration failure such as SPsourceID configuration conflict. When the primary backbone device is abnormal, the primary backbone device is unable to send the second notification message to other backbone devices in the SPBM network.

Accordingly, other backbone devices in the SPBM network are to learn the abnormality of the primary backbone device through a certain method. Other backbone devices except the primary backbone device in the SPBM network may perform following processes. After detecting the change of the network topology and new STP trees have been calculated, each of other backbone devices determines whether LSP information corresponding to the primary backbone device in a local LSDB is updated within a period of time $X*T$. If the LSP information (for example, an LSP ID) corresponding to the primary backbone device is updated within a period of time $X*T$, the backbone device does not perform any processing. If the LSP information corresponding to the primary backbone device is not updated within a period of time $X*T$, the backbone device determines that the primary backbone device is abnormal, and reselects a new primary backbone device through the automatic vote method.

X is a predefined natural number larger than 1, and T is an aging period of LSP information.

Figures 3, 4:
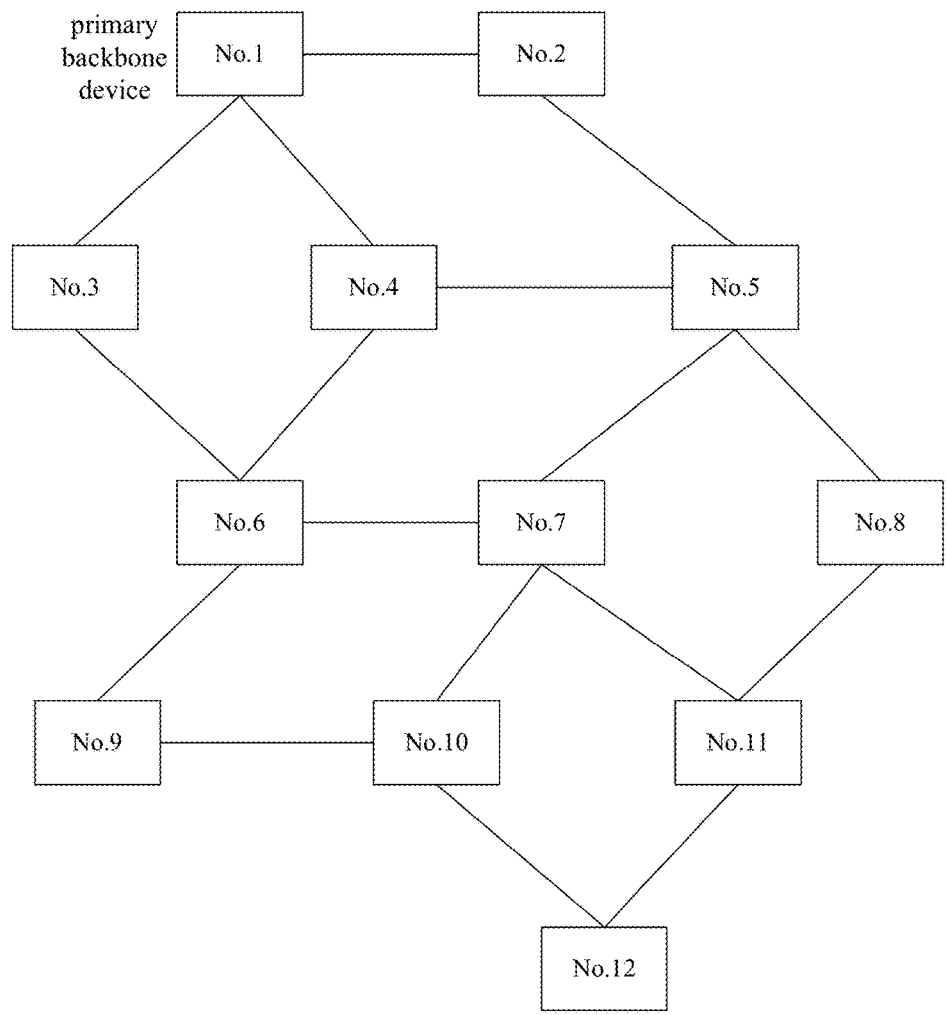
FIG. 3 is a diagram illustrating a format of a notification message according to an example of the present disclosure.
FIG. 4 is a diagram of an SPBM network.

In an example, the first notification message and the second notification message may adopt a Type Length Value (TLV) format shown in FIG. 3. Several fields shown in FIG. 3 will be illustrated hereinafter.

A field of "Type" represents that the TLV is a notification message, for example, the first notification message or the second notification message. For example, the value of the field of "Type" may be equal to 34.

A field of "Length" may carry a Value field of the TLV, which is the total length of fields except the fields of "Type" and "Length".

A field of "System_ID" may carry the IDs of the backbone devices in the selected group. For example, the length of the field of "System_ID" may be 6 bytes×S, wherein S represents the number of backbone devices in the selected group.

A field of "Bit Switch" (called a rapid flood function switch control bit) may indicate to enable/disable the rapid flood function. When the value of the field of "Bit Switch" is set as a first value, for example, "1", the field of "Bit Switch" indicates to enable the rapid flood function. When the value of the field of "Bit Switch" is set as a second value, for example, "0", the field of "Bit Switch" indicates to disable the rapid flood function. The length of the field of "Bit Switch" may be 1 bit.

A field of "Reset Switch" (called a reset switch control bit) may indicate whether to reselect a new primary backbone device. When the value of the field of "Reset Switch" is set as a third value, for example, "1", the field of "Reset Switch" indicates to reselect a new primary backbone device. When the value of the field of "Reset Switch" is set as a fourth value, for example, "0", the field of "Reset Switch" indicates not to reselect a new primary backbone device.

In the first notification message, the field of "System_ID" is set as the system IDs of the backbone devices in the selected group, Bit Switch=1, and Reset Switch=0. In the second notification message, Reset Switch=1. The value of the field of "System_ID" and the value of the field of "Bit Switch" are not limited.

FIG. 4 is a diagram of an SPBM network. The rapid flood processing method provided by the example of the present disclosure will be illustrated by referring to the SPBM network shown in FIG. 4. The SPBM network shown in FIG. 4 includes backbone devices No. 1-No. 12. Suppose the backbone device No. 1 is selected as the primary backbone device.

Figure 5:
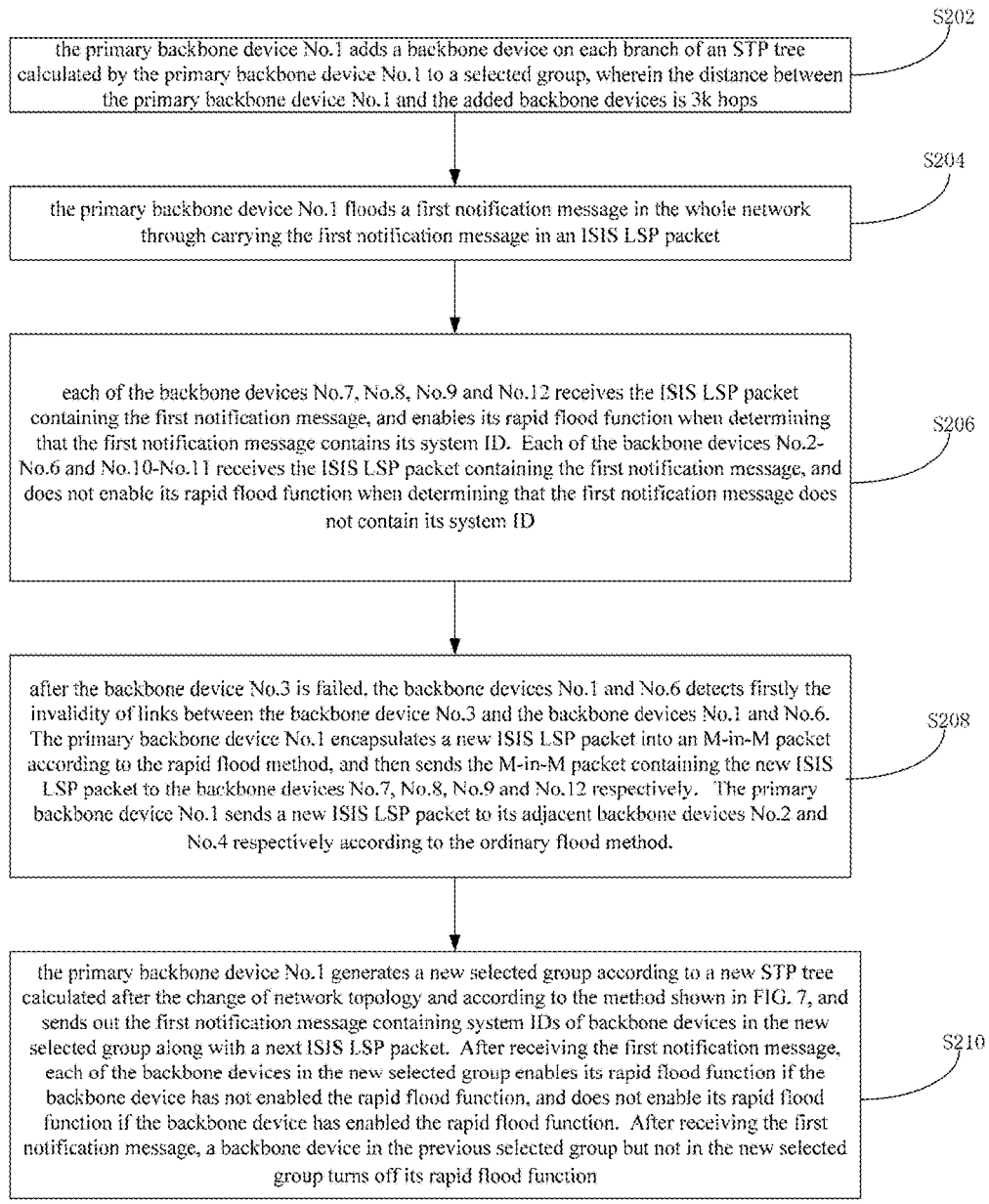
FIG. 5 is a flowchart illustrating a rapid flood processing method according to another example of the present disclosure.

Based on FIG. 4, the rapid flood processing method includes following blocks shown in FIG. 5.

At block S202, the primary backbone device No. 1 adds a backbone device on each branch of an STP tree calculated by the primary backbone device No. 1 to a selected group, wherein the distance between the primary backbone device No. 1 and the added backbone devices is 3 k hops, k=1, 2, . . . .

Figure 6:
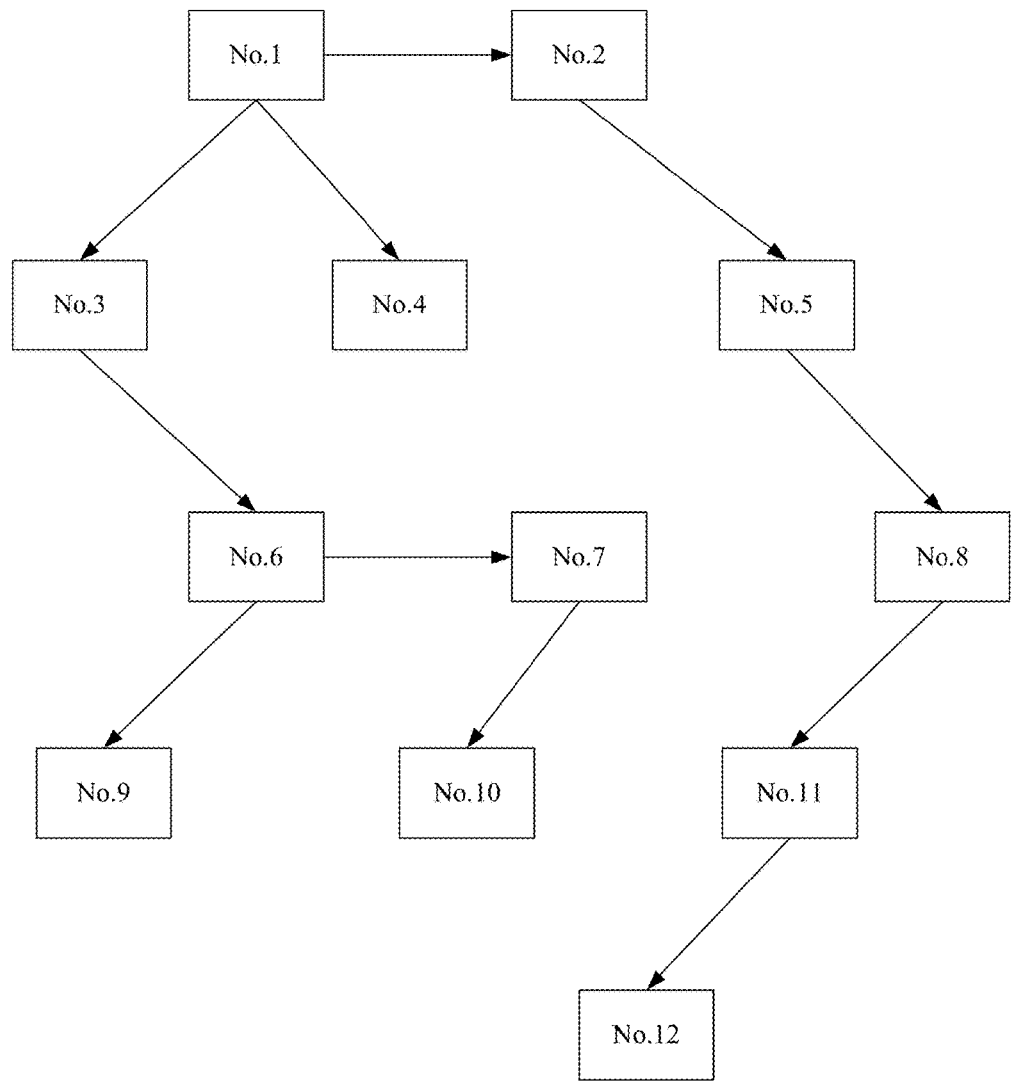
FIG. 6 is a diagram illustrating an STP tree that is calculated by a backbone device No. 1 shown in FIG. 4 according to an example of the present disclosure.
Figure 7:
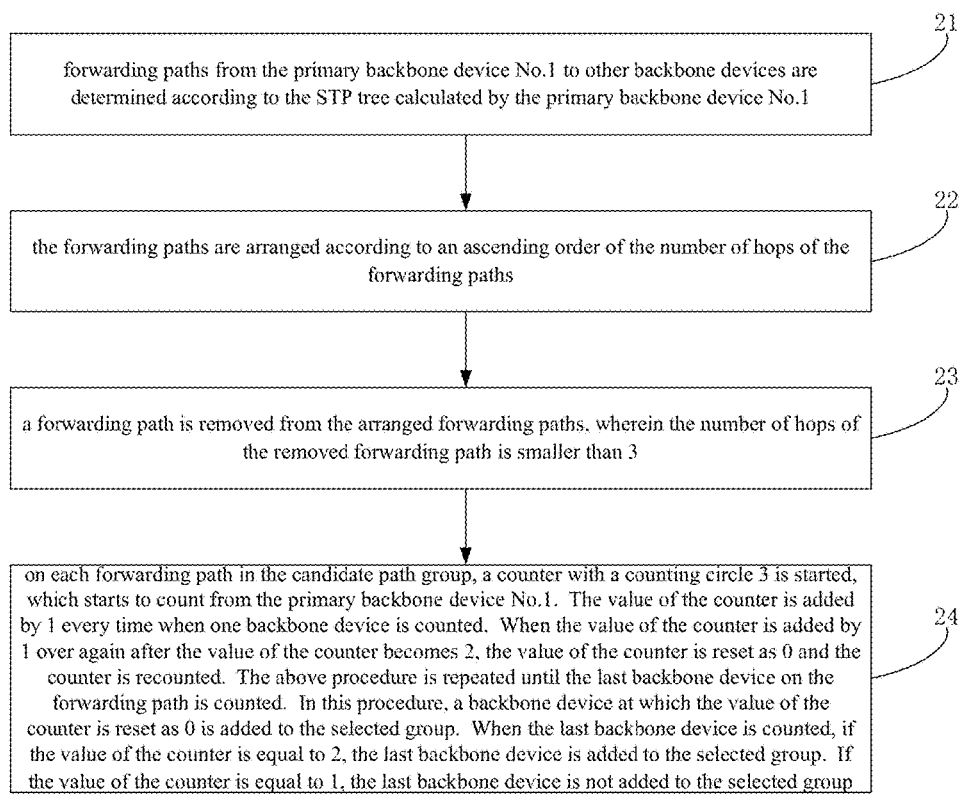
FIG. 7 is a flowchart illustrating a method for adding a backbone device to a selected group by the backbone device No. 1 shown in FIG. 4, wherein a distance between the added backbone device and the backbone device No. 1 is 3 k hops.

The STP tree calculated by the primary backbone device No. 1 is shown in FIG. 6. A procedure of adding the backbone device to the selected group is shown in FIG. 7, wherein the distance between the primary backbone device No. 1 and the added backbone device is 3 k hops.

At block 21, forwarding paths from the primary backbone device No. 1 to other backbone devices are determined according to the STP tree calculated by the primary backbone device No. 1.

At block 22, the forwarding paths are arranged according to an ascending order of the number of hops of the forwarding paths. The forwarding paths are arranged as follows:

Forwarding path 1: No. 1→No. 2
Forwarding path 2: No. 1→No. 4
Forwarding path 3: No. 1→No. 3
Forwarding path 4: No. 1→No. 2→No. 5
Forwarding path 5: No. 1→No. 3→No. 6
Forwarding path 6: No. 1→No. 3→No. 6→No. 7
Forwarding path 7: No. 1→No. 2→No. 5→No. 8
Forwarding path 8: No. 1→No. 3→No. 6→No. 9
Forwarding path 9: No. 1→No. 2→No. 5→No. 8→No. 11
Forwarding path 10: No. 1→No. 3→No. 6→No. 7→No. 10
Forwarding path 11: No. 1 →No. 2→No. 5→No. 8→No. 11 →No. 12.

At block 23, a forwarding path is removed from the arranged forwarding paths, wherein the number of hops of the removed forwarding path is smaller than 3. That is, forwarding paths 1-5 are removed, and remaining forwarding paths 6-11 are added to a candidate path group.

At block 24, on each forwarding path in the candidate path group, a counter with a counting circle 3 is started, which starts to count from the primary backbone device No. 1. The value of the counter is added by 1 every time when one backbone device is counted. When the value of the counter is added by 1 over again after the value of the counter becomes 2, the value of the counter is reset as 0 and the counter is recounted. The above procedure is repeated until the last backbone device on the forwarding path is counted. In this procedure, a backbone device at which the value of the counter is reset as 0 is added to the selected group. When the last backbone device is counted, if the value of the counter is equal to 2, the last backbone device is added to the selected group. If the value of the counter is equal to 1, the last backbone device is not added to the selected group.

Figure 8:
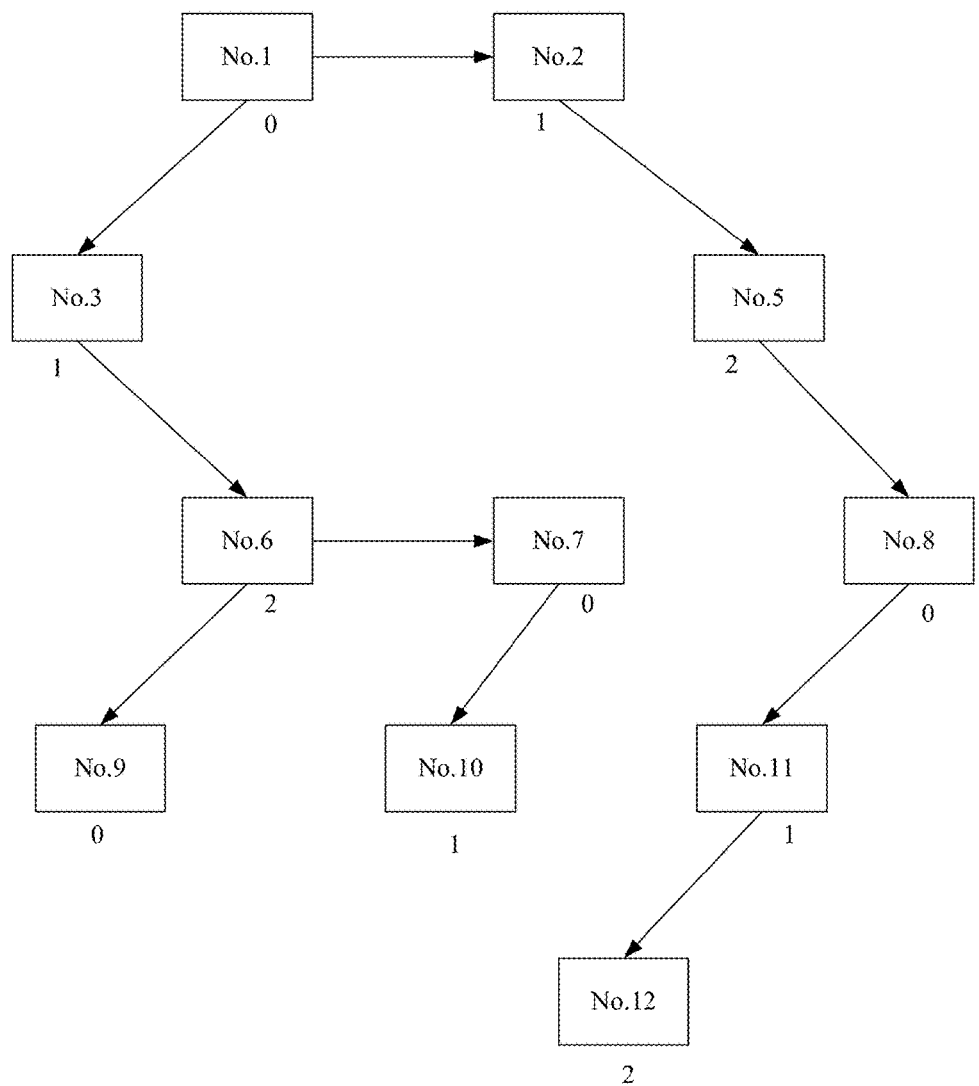
FIG. 8 is a diagram illustrating a counting result obtained through counting each of backbone devices on each forwarding path after the backbone device No. 1 shown in FIG. 4 removes a forwarding path, wherein the number of hops of the removed forwarding path is smaller than N.
Figure 9:
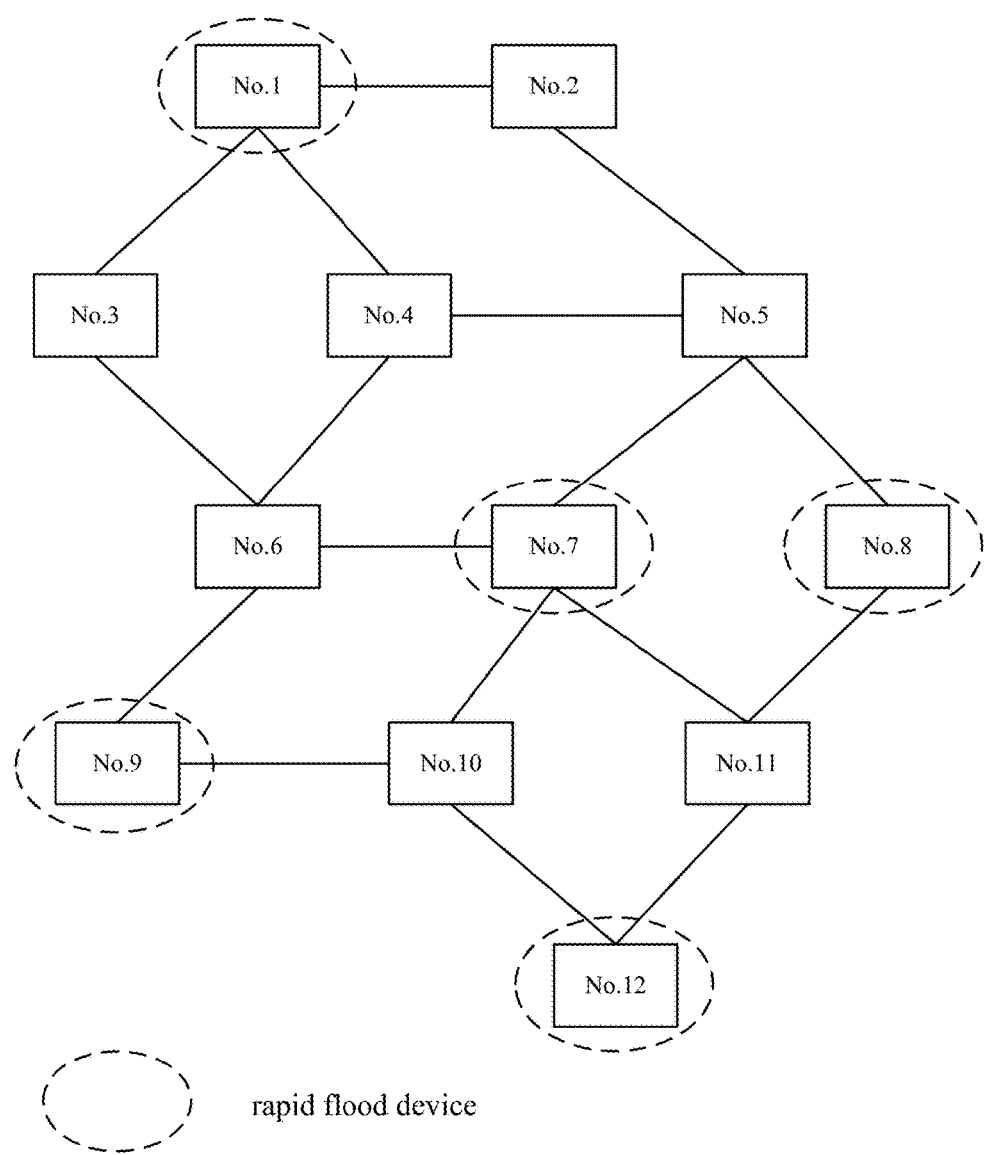
FIG. 9 is a diagram illustrating the deployment of rapid flood devices in the SPBM network shown in FIG. 4 according to an example of the present disclosure.

The counting procedure of the counter is shown in FIG. 8. Finally, backbone devices in the selected group include the backbone devices No. 7, No. 8, No. 9 and No. 12. Rapid flood devices in the SPBM network include the backbone devices No. 1, No. 7, No. 8, No. 9 and No. 12, as shown in FIG. 9.

At block S204, the primary backbone device No. 1 floods a first notification message in the whole network through carrying the first notification message in an ISIS LSP packet. The format of the first notification message is shown in FIG. 3. System_ID is system IDs of the backbone devices No. 7, No. 8, No. 9 and No. 12, Bit Switch=1, and Reset Switch=0.

At block S206, each of the backbone devices No. 7, No. 8, No. 9 and No. 12 receives the ISIS LSP packet containing the first notification message, and enables its rapid flood function when determining that the first notification message contains its system ID. Each of the backbone devices No. 2-No. 6 and No. 10-No. 11 receives the ISIS LSP packet containing the first notification message, and does not enable its rapid flood function when determining that the first notification message does not contain its system ID.

Figure 10:
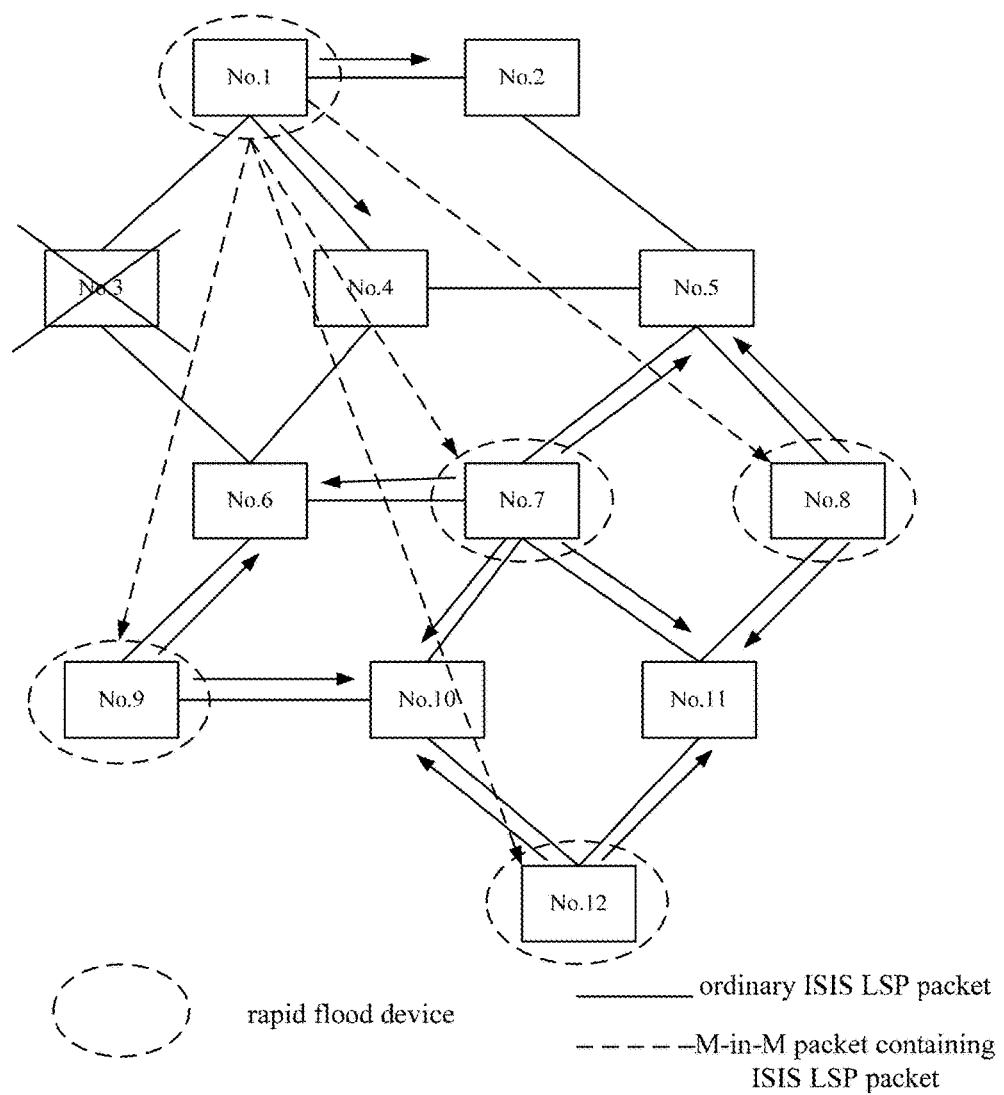
FIG. 10 is a diagram illustrating the rapid flooding and ordinary flooding of a packet after a backbone device No. 3 shown in FIG. 9 is failed according to an example of the present disclosure.

At block S208, after the backbone device No. 3 is failed, the backbone devices No. 1 and No. 6 detects firstly that links between the backbone device No. 3 and the backbone devices No. 1 and No. 6 is unavailable. The primary backbone device No. 1 encapsulates a new ISIS LSP packet into an M-in-M packet according to the rapid flood method, and then sends the M-in-M packet containing the new ISIS LSP packet to the backbone devices No. 7, No. 8, No. 9 and No. 12 respectively. Since the backbone device No. 3 is failed, the M-in-M packet sending to the backbone devices No. 7 and No. 9 is unable to reach the backbone devices No. 7 and No. 9. Further, the primary backbone device No. 1 sends a new ISIS LSP packet to its adjacent backbone devices No. 2 and No. 4 respectively according to the ordinary flood method. The backbone device No. 6 sends a new ISIS LSP packet (not shown in FIG. 10) to its adjacent backbone devices No. 7 and No.9 respectively according to the ordinary flood method.

After receiving the new ISIS LSP packet, each of the backbone devices No. 2 and No. 4 updates a local LSDB according to the ordinary flood method, and continues to flood the new ISIS LSP packet to the whole network.

After receiving the M-in-M packet containing the ISIS LSP packet, each of the backbone devices No. 8 and No. 12 updates a local LSDB, and sends the new ISIS LSP packet to adjacent backbone devices through its all UP ports according to the ordinary flood method. After receiving the new ISIS LSP packet, each of the backbone devices No. 7 and No.9 updates a local LSDB, and sends the new ISIS LSP packet to adjacent backbone devices according to the ordinary flood method. After receiving the new ISIS LSP packet from the backbone device No. 6, each of the backbone devices No. 7 and No. 9 encapsulates the new ISIS LSP packet into an M-in-M packet and sends the M-in-M packet to other rapid flood devices (not shown in FIG. 10).

At block S210, the primary backbone device No. 1 generates a new selected group according to a new STP tree calculated after the change of network topology and according to the method shown in FIG. 7, and sends out the first notification message containing system IDs of backbone devices in the new selected group along with a next ISIS LSP packet. After receiving the first notification message, each of the backbone devices in the new selected group enables its rapid flood function if the backbone device has not enabled the rapid flood function, and does not enable its rapid flood function if the backbone device has enabled the rapid flood function. After receiving the first notification message, a backbone device in the previous selected group but not in the new selected group disables its rapid flood function.

In the above procedure, for each backbone device in the SPBM network, either the backbone device is a rapid flood device, or at least one adjacent device of the backbone device is a rapid flood device. In this case, when network topology changes, at least one rapid flood device may rapidly apperceive the change of the network topology, and may send a specific protocol packet to all devices in the SPBM network rapidly based on the combination of the rapid flood method and the ordinary flood method. In this case, when the network topology changes, it just takes triple LDP processing time at most for each backbone device in the SPBM network to update the LSP information (suppose LSP processing rates of backbone devices are identical). Further, the number of redundant ISIS LSP packets is not increased in the SPBM network, and thus the flood speed of ISIS LSP packets is improved, thereby rapidly updating LSP information in the SPBM network.

Based on the rapid flood processing method, an example of the present disclosure provides a rapid flood processing apparatus, which may be applied to a backbone device in the SPBM network.

Figure 11:
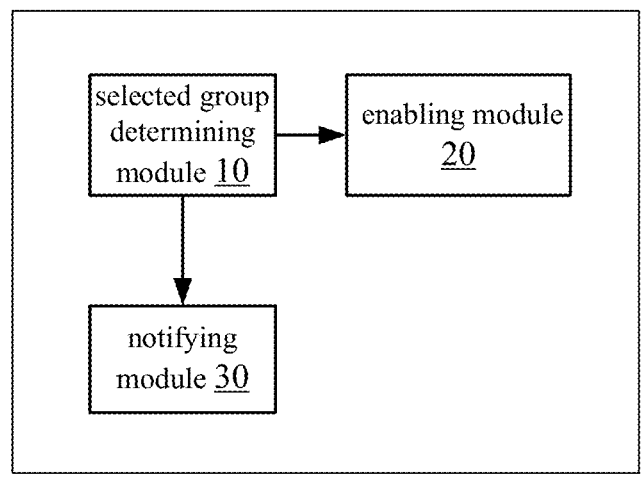
FIG. 11 is a diagram illustrating a rapid flood processing apparatus according to an example of the present disclosure.

As shown in FIG. 11, the apparatus includes a selected group determining module 10, an enabling module 20 and a notifying module 30.

When the backbone device is a primary backbone device, the selected group determining module 10 adds a backbone device on each branch of an STP tree calculated by the primary backbone device to a selected group, wherein the distance between the primary backbone device and the added backbone device is kN hops. k is an integer and N is a predefined natural number, where $3 \leq N \leq 6$, k=1, 2, . . . .

The enabling module 20 enables a rapid flood function of the backbone device.

The notifying module 30 notifies a backbone device in the selected group of the enabling of the rapid flood function.

The selected group determining module 10 includes a forwarding path determining unit, an arranging unit, a removing unit and an adding unit.

The forwarding path determining unit may determine forwarding paths from the backbone device to other backbone devices in the SPBM network according to the STP tree.

The arranging unit may arrange the forwarding paths according to an ascending order of the number of hops of the forwarding paths.

The removing unit may remove a forwarding path from the arranged forwarding paths, wherein the number of hops of the removed forwarding path is smaller than N.

The adding unit may add the backbone device on each of remaining forwarding paths to the selected group, wherein the distance between the backbone device and the added backbone device on each of remaining forwarding paths is kN hops.

When the number M of hops a specific backbone device to the last backbone device on each of the remaining forwarding paths meets a condition, the adding unit may add the last backbone device to the selected group. The specific backbone device is a backbone device on the forwarding path that is closest to the last backbone device and has been added to the selected group. The condition is $N/2 < M < N$.

The apparatus determines whether the backbone device is the primary backbone device through two methods, including a configuration method and an automatic vote method.

For example, the apparatus determines whether the backbone device is the primary backbone device through the configuration.

Figure 12:
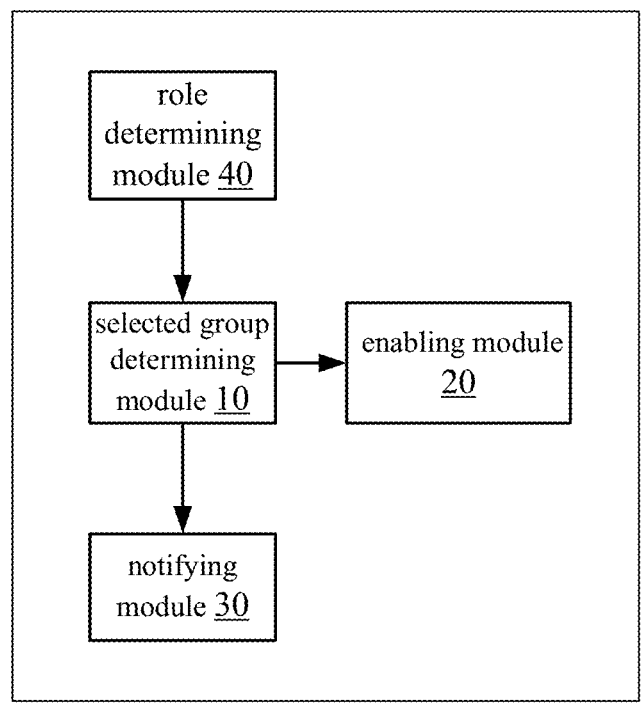
FIG. 12 is a diagram illustrating a rapid flood processing apparatus according to another example of the present disclosure.

As shown in FIG. 12, the apparatus further includes a role determining module 40.

The role determining module 40 may determine through the configuration whether the backbone device is the primary backbone device. The configuration includes determining according to configuration information whether the backbone device is the primary backbone device.

The selected group determining module 10 may clear the selected group when learning the change of network topology. The selected group determining module 10 may add a backbone device on each branch of a new STP tree calculated by the backbone device to a new selected group, wherein the distance between the backbone device and the added backbone device is kN hops. The change of the network topology does not include following conditions. The conditions include that the rapid flood function of the primary backbone device is disabled manually and the primary backbone device is abnormal.

The notifying module 30 may notify backbone devices in the new selected group of the enabling of the rapid flood function, and notifying a backbone device in the previous selected group but not in the new selected group of the disabling of the rapid flood function.

The notifying module 30 sends a first notification message to all other backbone devices in the SPBM network. The first notification message includes IDs of backbone devices in the new selected group. The first notification message may indicate each of other backbone devices receiving the first notification message in the SPBM network to determine whether the first notification message contains the ID of the backbone device. When determining that the first notification message does not contain the ID of the backbone device and the backbone device has enabled the rapid flood function, the backbone device disables its rapid flood function. When determining that the first notification message contains the ID of the backbone device and the backbone device has not enabled the rapid flood function, the backbone device enables its rapid flood function.

For another example, the apparatus determines whether the backbone device is the primary backbone device through the automatic vote method.

As shown in FIG. 12, the apparatus further includes a role determining module 40.

The role determining module 40 may determine through the automatic vote method whether the backbone device is the primary backbone device. The automatic vote method includes determining whether the ID of the backbone device meets a predefined rule. If the ID of the backbone device meets the predefined rule, it is determined that the backbone device is the primary backbone device. Otherwise, it is determined that the backbone device is not the primary backbone device. The predefined rule includes that the ID of the backbone device is the largest or smallest ID among IDs of all backbone devices in the SPBM network. When learning the change of the network topology and it is because a new backbone device is added to the SPBM network that the network topology changes, the role determining module 40 determines over again whether the ID of the backbone device meets the predefined rule. The change of the network topology does not include such change that the rapid flood function of the primary backbone device is disabled manually and the primary backbone device is abnormal.

The selected group determining module 10 may clear the selected group when the role determining module 40 determines over again that the ID of the backbone device meets the predefined rule. The selected group determining module 10 may add a backbone device on each branch of a new STP tree calculated by the backbone device to a new selected group, wherein the distance between the backbone device and the added backbone device is kN hops.

The notifying module 30 may notify backbone devices in the new selected group of the enabling of the rapid flood function, and notifying a backbone device in the previous selected group but not in the new selected group of the disabling of the rapid flood function.

The notifying module 30 sends a first notification message to all other backbone devices in the SPBM network. The first notification message includes IDs of backbone devices in the new selected group and indicates each of other backbone devices receiving the first notification message in the SPBM network to determine whether the first notification message contains the ID of the backbone device. When determining that the first notification message does not contain the ID of the backbone device and the backbone device has enabled the rapid flood function, the backbone device receiving the first notification message disables its rapid flood function. When determining that the first notification message contains the ID of the backbone device and the backbone device has not enabled the rapid flood function, the backbone device receiving the first notification message enables its rapid flood function.

When determining over again that the ID of the backbone device does not meet the predefined rule, the role determining module 40 switches the backbone device to a non-primary backbone device. The notifying module 30 may send a second notification message to all other backbone devices in the SPBM network when the role determining module 40 determines over again that the ID of the backbone device does not meet the predefined rule. The second notification message may indicate each of other backbone devices in the SPBM network to reselect a new primary backbone device through the automatic vote method.

The notifying module 30 may send the second notification message to all other backbone devices in the SPBM network when the rapid flood function of the backbone device is disabled manually. The second notification message may indicate each of other backbone devices in the SPBM network to reselect a new primary backbone device through the automatic vote method.

The apparatus further includes a determining module and a processing module.

When the backbone device is not the primary backbone device and after the network topology changes and a new STP tree is calculated, the determining module may determine whether LSP information corresponding to the primary backbone device in a local LSDB is updated within a period of time X*T.

The processing module may determine that the primary backbone device is abnormal when the determining module determines that the LSP information corresponding to the primary backbone device in the local LSDB is not updated within a period of time X*T, and reselect a new primary backbone device through the automatic vote method. X is a predefined natural number larger than 1, and T is an aging period of LSP information.

In the solution provided by the examples of the present disclosure, a backbone device is selected from the SPBM network as the primary backbone device. The primary backbone device adds a backbone device on each branch of the STP tree calculated by the primary backbone device to the selected group, wherein the distance between the primary backbone device and the added backbone device is kN hops, 3≤N≤6, k=1, 2, . . . . After adding all backbone devices meeting the condition to the selected group, the primary backbone device enables the rapid flood function, and notifies all backbone devices in the selected group of the enabling of the rapid flood function. Accordingly, through automatically selecting and enabling the rapid flood function of the backbone devices in the SPBM network, the rapid flooding may be implemented. By the rapid flood processing method provided by the examples of the present disclosure, the devices enabling the rapid flood function may be automatically selected and deployed, and the rapid flood function of these devices may be automatically enabled. Further, there are 2-5 backbone devices unenabling the rapid flood function between any two backbone devices enabling rapid flood function. Accordingly, the number of backbone devices enabling the rapid flood function in the SPBM network is proper. If the backbone devices enabling the rapid flood function are deployed reasonably in the SPBM network, the network topology may be well converged, and the number of redundant specific protocol packets may be reduced.

Figure 13:
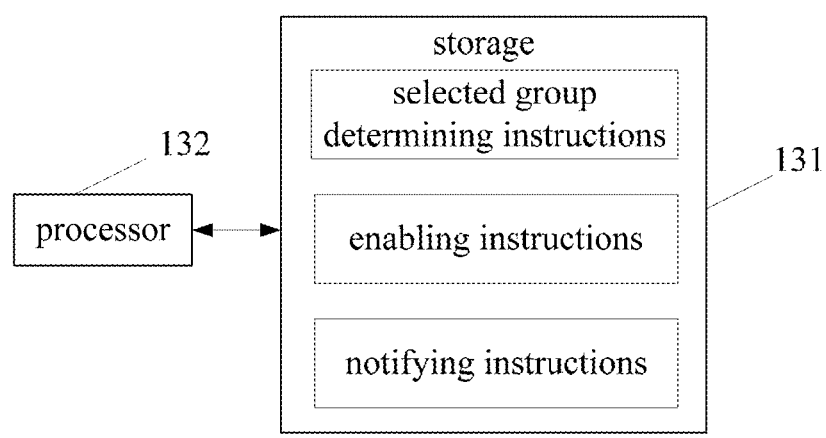
FIG. 13 is a diagram illustrating a rapid flood processing apparatus according to another example of the present disclosure.

FIG. 13 is a diagram illustrating a rapid flood processing apparatus according to another example of the present disclosure. The apparatus may be applied to a backbone device in an SPBM network. The SPBM network includes at least two backbone devices, which each supports a rapid flood function. The apparatus at least includes a storage 131 and a processor 132 communicating with the storage 131, in which the storage 131 includes selected group determining instructions, enabling instructions and notifying instructions that can be executed by the processor 132. The storage 131 may be a non-transitory computer readable storage medium and the selected group determining instructions, the enabling instructions and the notifying instructions may be machine readable instructions stored in the storage 131. The processor 132 may also execute the machine readable instructions stored in the storage 131.

After executing the selected group determining instructions, the processor may add a backbone device on each branch of an STP tree calculated by the backbone device to a selected group when the backbone device is a primary backbone device, wherein the distance between the backbone device and the added backbone device is kN hops. k is an integer and N is a predefine natural number, where $3 \leq N \leq 6$, k=1, 2, . . . .

After executing the enabling instructions, the processor may enable a rapid flood function of the backbone device.

After executing the notifying instructions, the processor may notify a backbone device in the selected group of the enabling of the rapid flood function.

In an example, the selected group determining instructions include forwarding path determining sub-instructions, arranging sub-instructions, removing sub-instructions and adding sub-instructions.

After executing the forwarding path determining sub-instructions, the processor may determine forwarding paths from the backbone device to other backbone devices in the SPBM network according to the STP tree.

After executing the arranging sub-instructions, the processor may arrange the forwarding paths according to an ascending order of the number of hops of the forwarding paths.

After executing the removing sub-instructions, the processor may remove a forwarding path from the arranged forwarding paths, wherein the number of hops of the removed forwarding path is smaller than N.

After executing the adding sub-instructions, the processor may add the backbone device on each of remaining forwarding paths to the selected group, wherein the distance between the backbone device and the added backbone device on each of remaining forwarding paths is kN hops.

In an example, after executing the adding sub-instructions, the processor may add the last backbone device to the selected group when the number M of hops from a specific backbone device to the last backbone device on each of the remaining forwarding paths meets a condition. The specific backbone device is a backbone device on the forwarding path that is closest to the last backbone device and has been added to the selected group. The condition is $N/2 < M < N$.

In an example, the apparatus further includes role determining instructions. After executing the role determining instructions, the processor may determine through the configuration whether the backbone device is the primary backbone device. The configuration includes determining according to configuration information whether the backbone device is the primary backbone device. After executing the selected group determining instructions, the processor may clear the selected group when learning the change of network topology. Further the processor may add a backbone device on each branch of a new STP tree calculated by the backbone device to a new selected group, wherein the distance between the backbone device and the added backbone device is kN hops. The change of the network topology does not include such change that the rapid flood function of the primary backbone device is disabled manually and the primary backbone device is abnormal. After executing the notifying instructions, the processor may notify backbone devices in the new selected group of the enabling of the rapid flood function, and notify backbone devices in the previous selected group but not in the new selected group of the disabling of the rapid flood function.

In another example, the apparatus further includes role determining instructions. After executing the role determining instructions, the processor may determine through the automatic vote method whether the backbone device is the primary backbone device. The automatic vote method includes determining whether the ID of the backbone device meets a predefined rule. If the ID of the backbone device meets the predefined rule, the processor determines that the backbone device is the primary backbone device. Otherwise, the processor determines that the backbone device is not the primary backbone device. The predefined rule includes that the ID of the backbone device is the largest or smallest ID among IDS of all backbone devices in the SPBM network. When learning the change of the network topology except following conditions and it is because a new backbone device is added to the SPBM network that the network topology changes, the processor determines over again whether the ID of the backbone device meets the predefined rule. The change of the network topology does not include such change that the rapid flood function of the primary backbone device is disabled manually and the primary backbone device is abnormal. After executing the selected group determining instructions, the processor may clear the selected group when determining over again that the ID of the backbone device meets the predefined rule. The processor may add a backbone device on each branch of a new STP tree calculated by the backbone device to a new selected group, wherein the distance between the backbone device and the added backbone device is kN hops. After executing the notifying instructions, the processor may notify backbone devices in the new selected group of the enabling of the rapid flood function, and notifying backbone devices in the previous selected group but not in the new selected group of the disabling of the rapid flood function.

In an example, after executing the notifying instructions, the processor may send a first notification message to all other backbone devices in the SPBM network. The first notification message contains IDs of backbone devices in the new selected group. The first notification message may indicate each of other backbone devices receiving the first notification message in the SPBM network to determine whether the first notification message contains the ID of the backbone device. When determining that the first notification message does not contain the ID of the backbone device and the backbone device has enabled the rapid flood function, the backbone device disables its rapid flood function. When determining that the first notification message contains the ID of the backbone device and the backbone device has not enabled the rapid flood function, the backbone device enables the rapid flood function.

In an example, the processor executes the role determining instructions. When determining over again that the ID of the backbone device does not meet the predefined rule, the processor switches the backbone device to a non-primary backbone device. After executing the notifying instructions, the processor may send a second notification message to all other backbone devices in the SPBM network when determining over again that the ID of the backbone device does not meet the predefined rule. The second notification message may indicate each of other backbone devices in the SPBM network to reselect a new primary backbone device through the automatic vote method.

In an example, after executing the notifying instructions, the processor may send the second notification message to all other backbone devices in the SPBM network when the rapid flood function of the backbone device is disabled manually. The second notification message may indicate each of other backbone devices in the SPBM network to reselect a new primary backbone device through the automatic vote method.

In an example, the apparatus further includes determining instructions and processing instructions.

The processor executes the determining instructions. When the backbone device is not the primary backbone device, and after the network topology changes and a new STP tree is calculated, the processor may determine whether LSP information corresponding to the primary backbone device in a local LSDB is updated within a period of time X*T. After executing the processing instructions, the processor may determine that the primary backbone device is abnormal when determining that the LSP information corresponding to the primary backbone device in the local LSDB is not updated within a period of time X*T, and reselected a new primary backbone device through the automatic vote method. X is a predefined natural number larger than 1, and T is an aging period of LSP information.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A rapid flood processing method, applied to a Shortest Path Bridging MAC (SPBM) network and comprising:
    when a device is a primary backbone device, adding a backbone device on each branch of a Spanning Tree Protocol (STP) tree calculated by the device to a selected group, a distance between the device and the added backbone device being kN hops, and N being a predefined natural number and k being an integer, where 3≤N≤6, k=1, 2, . . . ; and
    enabling a rapid flood function of the device, and notifying backbone devices in the selected group of the enabling of the rapid flood function.

2. The method of claim 1, wherein adding the backbone device on each branch of the STP tree calculated by the device to the selected group, comprises:
    determining forwarding paths from the device to other backbone devices in the SPBM network according to the STP tree;
    arranging the forwarding paths according to an ascending order of the number of hops of the forwarding paths;
    removing a forwarding path from the arranged forwarding paths, wherein the number of hops of the removed forwarding path is smaller than N; and
    adding the backbone device on each remaining forwarding path to the selected group, wherein the distance between the device and the added backbone device on each of the remaining forwarding paths is kN hops.

3. The method of claim 2, wherein adding the backbone device on each branch of the STP tree calculated by the device to the selected group, further comprises:
    when the number M of hops from a specific backbone device to the last backbone device on each of the remaining forwarding paths meets a condition, adding the last backbone device to the selected group, wherein the specific backbone device is a backbone device on the forwarding path that is closest to the last backbone device and has been added to the selected group, and the condition is N/2<M<N.

4. The method of claim 1, further comprising:
    determining according to configuration information whether the device is the primary backbone device; and
    clearing the selected group after learning change of network topology, adding a backbone device on each branch of a new STP tree calculated by the device to a new selected group, wherein a distance between the device and the added backbone device is kN hops; notifying backbone devices in the new selected group of the enabling of the rapid flood function, and notifying backbone devices in the previous selected group but not in the new selected group of the disabling of the rapid flood function.

5. The method of claim 4, wherein notifying the backbone devices in the new selected group of the enabling of the rapid flood function, and notifying the backbone devices in the previous selected group but not in the new selected group of the disabling of the rapid flood function comprises:
    sending to all other backbone devices in the SPBM network a first notification message containing IDs of the backbone devices in the new selected group, wherein the first notification message indicates each of other backbone devices receiving the first notification message in the SPBM network to determine whether the first notification message contains an ID of the backbone device; when determining that the first notification message does not contain the ID of the backbone device and the backbone device has enabled the rapid flood function, disabling the rapid flood function of the backbone device; when determining that first notification message contains the ID of the backbone device and the backbone device has not enabled the rapid flood function, enabling the rapid flood function of the backbone.

6. A rapid flood processing apparatus, applied to a Shortest Path Bridging MAC (SPBM) network, the apparatus comprising a processor for executing instructions stored in a non-transitory computer readable storage medium, the instructions comprise:
    selected group determining instructions, to add a backbone device on each branch of a Spanning Tree Protocol (STP) tree calculated by a device to a selected group when the device is a primary backbone device, a distance between the device and the added backbone device being kN hops, k being an integer and N being a predefined natural number, where 3≤N≤6, k=1,2, . . . ;
    enabling instructions, to enable the rapid flood function of the device; and
    notifying instructions, to notify backbone devices in the selected group of the enabling of the rapid flood function.

7. The apparatus of claim 6, wherein the selected group determining instructions comprise:
    forwarding path determining sub-instructions, to determine forwarding paths from the device to other backbone devices in the SPBM network according to the STP tree;

arranging sub-instructions, to arrange the forwarding paths according to an ascending order of the number of hops of the forwarding paths;

removing sub-instructions, to delete a forwarding path from the arranged forwarding paths wherein the number of hops of the removed forwarding path is smaller than N; and adding sub-instructions, to add the backbone device on each remaining forwarding paths to the selected group, wherein the distance between the device and the added backbone device on each of the remaining forwarding paths is kN hops.

8. The apparatus of claim 7, wherein the adding sub-instructions are further to, when the number M of hops from a specific backbone device to the last backbone device on each of the remaining forwarding paths meets a condition, add the last backbone device to the selected group, wherein the specific backbone device is a backbone device on the forwarding path that is closest to the last backbone device and has been added to the selected group, and the condition is N/2<M<N.

9. The apparatus of claim 6, further comprising:

role determining instructions, to determine through a configuration whether the device is the primary backbone device, wherein the configuration comprises determining according to configuration information whether the device is the primary backbone device;

the selected group determining instructions are to clear the selected group when learning change of network topology, add a backbone device on each branch of a new STP tree calculated by the device to a new selected group, wherein the distance between the device and the added backbone device is kN hops, and the change of the network topology does not include that the rapid flood function of the primary backbone device is disabled manually and the primary backbone device is abnormal; and the notifying instructions are to notify backbone devices in the new selected group of the enabling of the rapid flood function, and notifying a backbone device in the previous selected group but not in the new selected group of the disabling of the rapid flood function.

10. The apparatus of claim 6, further comprising:

role determining instructions, to determine through an automatic vote method whether the device is the primary backbone device, wherein the automatic vote method comprises determining whether an ID of the device meets a predefined rule; when determining that the ID of the backbone device meets the predefined rule, determine that the device is the primary backbone device; when determining that the ID of the backbone device does not meet the predefined rule, determine that the device is not the primary backbone device; the predefined rule comprises that the ID of the device is the largest or smallest ID among IDs of all backbone devices in the SPBM network; when learning change of network topology and it is because a new backbone device is added to the SPBM network that the network topology changes, determine over again whether the ID of the device meets the predefined rule, wherein the change of the network topology does not comprise changes that the rapid flood function of the primary backbone device is disabled manually and the primary backbone device is abnormal;

the selected group determining instructions are to clear the selected group when the role determining instructions determine over again that the ID of the device meets the predefined rule, and add a backbone device on each branch of a new STP tree calculated by the device to a new selected group, wherein the distance between the device and the added backbone device is kN hops; and the notifying instructions are to notify backbone devices in the new selected group of the enabling of the rapid flood function, and notify a backbone device in the previous selected group but not in the new selected group of the disabling of the rapid flood function.

11. The apparatus of claim 9, wherein the notifying instructions are to send a first notification message to all other backbone devices in the SPBM network, wherein the first notification message comprises IDs of backbone devices in the new selected group and indicates each of other backbone devices receiving the first notification message in the SPBM network to determine whether the first notification message contains the ID of the backbone device; when determining that the first notification message does not contain the ID of the backbone device and the backbone device has enabled the rapid flood function, the backbone device receiving the first notification message disables the rapid flood function; when determining that the first notification message contains the ID of the backbone device and the backbone device has not enabled the rapid flood function, the backbone device receiving the first notification message enables the rapid flood function.

12. The apparatus of claim 10, wherein the notifying instructions are to send a first notification message to all other backbone devices in the SPBM network, wherein the first notification message comprises IDs of backbone devices in the new selected group and indicates each of other backbone devices receiving the first notification message in the SPBM network to determine whether the first notification message contains the ID of the backbone device; when determining that the first notification message does not contain the ID of the backbone device and the backbone device has enabled the rapid flood function, the backbone device receiving the first notification message disables the rapid flood function; when determining that the first notification message contains the ID of the backbone device and the backbone device has not enabled the rapid flood function, the backbone device receiving the first notification message enables the rapid flood function.

13. The apparatus of claim 10, wherein the role determining instructions are to switch the device to a non-primary backbone device when determining over again that the ID of the device does not meet the predefined rule; and the notifying instructions are to send a second notification message to all other backbone devices in the SPBM network when the role determining instructions determine over again that the ID of the device does not meet the predefined rule, wherein the second notification message indicates each of other backbone devices in the SPBM network to reselect a new primary backbone device through the automatic vote method.

14. The apparatus of claim 10, wherein the notifying instructions are to send a second notification message to all other backbone devices in the SPBM network when the rapid flood function of the device is disabled manually, wherein the second notification message indicates each of other backbone devices in the SPBM network to reselect a new primary backbone device through the automatic vote method.

15. The apparatus of claim 10, further comprising determining instructions and processing instructions, wherein when the device is not the primary backbone device and after the network topology changes and a new STP tree is calculated, the determining instructions are to determine whether LSP information corresponding to the primary backbone device in a local Link State Data Base (LSDB) is updated within a period of time X*T; and the processing instructions are to determine that the primary backbone device is abnormal when the determining instructions determine that the LSP information corresponding to the primary backbone device in the local LSDB is not updated within a period of time X*T, and reselect a new primary backbone device through the automatic vote method, X is a predefined natural number larger than 1, and T is an aging period of LSP information.

\* \* \* \* \*